United States Patent
Endo

(10) Patent No.: US 8,714,456 B2
(45) Date of Patent: May 6, 2014

(54) TWO-DIMENSIONAL CODE, TWO-DIMENSIONAL CODE READER, AND PROGRAM

(75) Inventor: Hiroyuki Endo, Tokyo (JP)

(73) Assignee: Shift Co. Ltd. (JP)

( * ) Notice: Subject to any disclaimer, the term of this patent is extended or adjusted under 35 U.S.C. 154(b) by 90 days.

(21) Appl. No.: 13/499,100

(22) PCT Filed: Sep. 30, 2010

(86) PCT No.: PCT/JP2010/005891

§ 371 (c)(1),
(2), (4) Date: Mar. 29, 2012

(87) PCT Pub. No.: WO2011/040032

PCT Pub. Date: Apr. 7, 2011

(65) Prior Publication Data

US 2012/0187193 A1     Jul. 26, 2012

(30) Foreign Application Priority Data

Sep. 30, 2009 (JP) ................................. 2009-227617
Apr. 14, 2010 (JP) ................................. 2010-092784

(51) Int. Cl.
    *G06K 7/12*          (2006.01)
(52) U.S. Cl.
    USPC ..................................... 235/469; 235/462.09
(58) Field of Classification Search
    USPC ........................................... 235/469, 462.09
    See application file for complete search history.

(56) References Cited

U.S. PATENT DOCUMENTS

2004/0182930 A1   9/2004   Nojiri
2007/0278303 A1   12/2007   Cattrone

FOREIGN PATENT DOCUMENTS

| JP | 2002-086809 | 3/2002 |
|---|---|---|
| JP | 2002-298083 | 10/2002 |
| JP | 2003-178277 | 6/2003 |
| JP | 2004-199203 | 7/2004 |
| JP | 2004-234318 | 8/2004 |
| JP | 2004-246717 | 9/2004 |
| JP | 2005-509223 | 4/2005 |
| JP | 2005208843 | 8/2005 |
| JP | 2006330930 | 12/2006 |
| JP | 2007-048070 | 2/2007 |
| JP | 2007157127 | 6/2007 |
| JP | 2007-323632 | 12/2007 |
| JP | 2008-004101 | 1/2008 |
| JP | 2009-152757 | 7/2009 |
| WO | WO 2009/060942 | 5/2009 |

OTHER PUBLICATIONS

International Search Report prepared by The Japanese Patent Office on Oct. 21, 2010 for International Application No. PCT/JP2010/005891.
Written Opinion (English translation) for International Patent Application No. PCT/JP2010/005891, issued on May 4, 2012 10 pages.
International Preliminary Report on Patentability (English translation) for International Patent Application No. PCT/JP2010/005891, issued on May 8, 2012, 11 pages.

*Primary Examiner* — Kristy A Haupt
(74) *Attorney, Agent, or Firm* — Sheridan Ross P.C.

(57) ABSTRACT

The aim is to reduce the influence of the filming environment of an image that represents a two-dimensional code when determining a color that has been added to a cell in the two-dimensional code. Disclosed is a two-dimensional code (100) in which a mark is added to each cell group in an information color or a combination color that is correlated with the information indicated by the cell group, and the mark for each cell (C) in the cell group is added in a specified coordinate color within a component domain from among a component model representing the distribution of color components, that is disposed in a positional relationship void of mutual interference.

14 Claims, 3 Drawing Sheets

[C-M Plane]

[M-Y Plane]

TWO-DIMENSIONAL CODE, TWO-DIMENSIONAL CODE READER, AND PROGRAM

CROSS REFERENCE TO RELATED APPLICATIONS

This application is a national stage application under 35 U.S.C. 371 of PCT Application No. PCT/JP2010/005891 having an international filing date of 30 Sep. 2010, which designated the United States, which PCT application claimed the benefit of Japanese Patent Application No. 2009-227617 2009 filed Sep. 30, 2009, and Japanese Patent Application No. 2010-092784 2010 filed Apr. 14, 2010, the entire disclosure of each of which is incorporated herein by reference.

FIELD OF THE INVENTION

The present invention relates to a two-dimensional code formed by arranging cells, and a two-dimensional code reader that recognizes information by reading the two-dimensional code.

BACKGROUND OF THE INVENTION

The applicant of the present application has proposed a two-dimensional code having large information capacity, in which information is encoded by coloring each of a plurality of cells (Japanese Laid-Open Patent Publication No. 2007-048070).

In this two-dimensional code, information expressed by a cell is encoded by applying one of a plurality of colors to the cell, and therefore an information capacity per cell can be increased. As a result, the overall information capacity of the two-dimensional code can be increased.

SUMMARY OF THE INVENTION

With the two-dimensional code described above, however, when the color attached to the cell is identified on a code reader, the color may be identified as a different color from the original color depending on the photographic environment of an image representing the two-dimensional code, and as a result, the information expressed by the cell may be recognized erroneously.

The present invention has been designed to solve this problem, and an objective thereof is to provide a technique for reducing the influence of the photographic environment of an image representing a two-dimensional code when identifying the color attached to a cell in the two-dimensional code.

To achieve the foregoing objective and in accordance with a first configuration (claim 1), a two-dimensional code formed by arranging cells in m×n (1≤m, 1≤n) is provided. Cell groups are formed by dividing the cells arranged in m×n into cell groups respectively constituted by one or more cells. A plurality of colors (to be referred to hereafter as "information colors") or color combinations (to be referred to hereafter as "combined colors") are respectively associated with different information. A mark is attached to each cell group using an information color or a combined color associated with information to be expressed by the cell group, from among the information colors and combined colors. When a component model is defined, in which a plurality of component regions respectively extending as multi-dimensional regions are located within a multi-dimensional space representing a distribution of color components in a positional relationship that prevents interference between the component regions, the marks are attached to the cell groups using components represented by specific coordinates in the component regions located in the component model as components of the information colors or respective color components included in the combined colors.

In the two-dimensional code thusly configured, marks are attached to the respective cell groups using the information colors or combined colors associated with the information to be expressed by the cell groups. The marks of the respective cells in the cell groups are attached using the color of the specific coordinates in the respective component regions that are located in the component model representing the color component distribution in a positional relationship that prevents interference between the component regions.

In other words, the marks are attached to the respective cells such that the color components do not interfere with other cells, excluding cells marked in the color of an identical component region. Therefore, as long as at least the component region of the color attached to each cell can be identified, it is possible to determine that the cell is marked in the color of the specific coordinates in the component region without identifying that the color of the mark corresponds to the color of the specific coordinates in the component region.

This means that even in a cell that is marked in a different color from its original color due to the photographic environment of the image representing the two-dimensional code, the color thereof can be identified as the color of the specific coordinates, or in other words the original color, as long as the color of the mark remains within the component region.

Hence, the influence of a difference in color from the original color due to the photographic environment can be suppressed by the component region, and therefore the color of the mark attached to each cell can be determined appropriately. As a result, erroneous recognition of the information expressed by the cell group can be prevented.

In this configuration, "attaching a mark to the cell group" means, for example, coloring each cell of the cell group, recording a specific symbol or a specific graphic (various graphics such as a circle, a polygon, or the like, for example) in each cell, and the like.

Further, the component model of the above configuration may be any model that represents a color component distribution within a multi-dimensional space, and the space may have two or more dimensions.

Furthermore, in the configuration described above, the component regions located in the component model define the number of colors used in the two-dimensional code, and as long as the component regions can be located in non-interfering regions, there are no particular limitations on the specific number thereof. "Non-interfering" means that the component regions are located so as not to overlap, and this may be achieved by disposing the component regions at intervals of at least a fixed size, for example.

Further, the component region may be defined as a space large enough to subsume a range of possible errors that may occur due to the photographic environment of the image. For example, a color at specific coordinates may be defined as a color in a typical photographic environment, and a region including the range of possible errors that may occur due to the photographic environment may be defined from this color as the component region. As a configuration for achieving this, the configuration described above may be modified by a second configuration (claim 2) described below.

In accordance with a second configuration, the component regions are located in the component model so as to extend respectively from the specific coordinates. Components represented by center coordinates of the respective component regions are used as the components of the information colors or the respective color components included in the combined colors.

According to this configuration, the original color of a cell marked in a different color from the original color due to the photographic environment of the image representing the two-dimensional code corresponds to the center coordinates of the component region, and therefore the color of the mark is unlikely to deviate from the component region. As a result, the color of the cell is more likely to be identified as the color of the specific coordinates, or in other words the original color.

The respective configurations described above may also be modified by a third configuration (claim 3) described below.

In accordance with a third configuration, the cells arranged in m×n are separated by a separator to which a predetermined color is attached. The components respectively represented by specific coordinates in the component regions located in the component model are used as the components of the information colors or the respective color components included in the combined colors, and also as a component of the color attached to the separator.

According to this configuration, the separator is formed in a color of a different component region from the colors of the marks attached to the cells, and therefore, even when the separator is formed in a different color from the original color thereof due to the photographic environment of the image representing the two-dimensional code, the color of the separator can be identified as the original color, or in other words identified reliably as the separator, as long as the color remains within the component region.

To achieve the foregoing objective and in accordance with a fourth configuration (claim 4), a two-dimensional code reader for recognizing information by reading a two-dimensional code formed by arranging cells in m×n (1≤m, 1≤n) is provided. The two-dimensional code reader includes an image acquisition section for obtaining an image representing the two-dimensional code, a cell identifying section for identifying, from the image obtained by the image acquisition section, colors of marks attached respectively to the cells of the two-dimensional code represented by the image, and an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section.

When a component model is defined, in which a plurality of component regions respectively extending as multi-dimensional regions are located within a multi-dimensional space representing a distribution of color components in a positional relationship that prevents interference between the component regions, the cell identifying section determines, in relation to each of the cells in the two-dimensional code, the component region located in the component model in which the component of the color attached to the cell is distributed, and identifies, as the color attached to the cell, the color of a component represented by specific coordinates of the determined component region.

The two-dimensional code reader thusly configured is suitable for recognizing information from the two-dimensional code according to any of the first to third configurations described above.

Further, in a case where the component model is formed by disposing the component regions so as to extend respectively from the specific coordinates, the above configuration may be modified by a fifth configuration (claim 5) described below.

In this configuration, the cell identifying section determines, in relation to a cell in each position of the two-dimensional code, the component region located in the component model in which the component of the color attached to the cell is distributed, and identifies, as the color attached to the cell, the color of the component represented by the center coordinates of the determined component region.

This configuration is suitable for recognizing information from the two-dimensional code according to the second configuration or the third configuration predicated on this configuration.

Further, the fourth and fifth configurations described above may be modified by a sixth configuration (claim 6) described below.

In this configuration, from an image region of the image obtained by the image acquisition section, the cell identifying section identifies, from among the component regions located in the component model, a region having a color represented by a component in a component region allocated to a separator that separates the respective cells of the two-dimensional code, and the cell identifying section assumes that the identified region is the separator of the two-dimensional code, and identifies respective regions separated by the separator as the positions of the cells in the two-dimensional code.

This configuration is suitable for recognizing information from the two-dimensional code according to the third configuration.

To achieve the foregoing objective, a program (claim 7) may be provided that is used for causing a computer to function as all constitutional sections provided in the two-dimensional code reader according to any one of first to sixth configurations.

The computer controlled by the first program may constitute a part of the two-dimensional code reader according to any of the fourth to sixth configurations.

The first program described above is constituted by a sequenced string of commands suitable for processing executed by a computer system, and is provided to the two-dimensional code reader, a user using the two-dimensional code reader, or the like via various types of recording media or a communication line.

To achieve the foregoing objective and in accordance with a seventh configuration of the present invention, a two-dimensional code formed by arranging cells in m×n (1≤m, 1≤n) is provided. Cell groups are formed by dividing the cells arranged in m×n into cell groups respectively constituted by one or more cells. A plurality of colors (to be referred to hereafter as "information colors") or color combinations (to be referred to hereafter as "combined colors") are respectively associated with different information. A mark is attached to each cell group using an information color or a combined color associated with information to be expressed by the cell group, from among the information colors and combined colors. Within a multi-dimensional space representing a distribution of color components, components represented by specific coordinates in a plurality of component regions extending respectively as multi-dimensional regions correspond respectively to components of the information colors or respective color components included in the combined colors. Each of the component regions is located in a coordinate position within the multi-dimensional space for maximizing the component of the information color or one of the respective color components included in the combined color.

In the two-dimensional code thusly configured, marks are attached to the respective cell groups using the information colors or combined colors associated with the information to be expressed by the cell groups, and the marks of the respective cells in the cell groups are attached using the color of the specific coordinates in component regions located in coordinate positions within the multi-dimensional space representing the color component distribution for maximizing the component of the information color or one of the respective color components included in the combined color.

In other words, the marks are attached to the respective cells such that the color components do not interfere with other cells, excluding cells marked in the color of an identical component region Therefore, as long as at least the component region of the color attached to each cell can be identified, it is possible to determine that the cell is marked in the color of the specific coordinates in the component region without determining that the color of the mark corresponds to the color of the specific coordinates in the component region.

This means that even in a cell that is marked in a different color from its original color due to the photographic environment of the image representing the two-dimensional code, the color thereof can be identified as the color of the specific coordinates, or in other words the original color, as long as the color of the mark remains within the component region.

Hence, the influence of a difference in color from the original color due to the photographic environment can be suppressed by the component region, and therefore the color of the mark attached to each cell can be determined appropriately. As a result, erroneous recognition of the information expressed by the cell group can be prevented.

In this configuration, "attaching a mark to the cell group" means, for example, coloring each cell of the cell group, recording a specific symbol or a specific graphic (various graphics such as a circle, a polygon, or the like, for example) in each cell, and the like.

Further, the component model of the above configuration may be any model that represents a color component distribution within a multi-dimensional space, and the space may have two or more dimensions.

Furthermore, in the configuration described above, the component regions located in the component model define the number of colors used in the two-dimensional code, and as long as the component regions can be located in non-interfering regions, there are no particular limitations on the specific number thereof. "Non-interfering" means that the component regions are located so as not to overlap, and this may be achieved by disposing the component regions at intervals of at least a fixed size, for example.

In accordance with an eighth configuration of the present invention, the components represented by the specific coordinates in the component regions preferably include at least color components of cyan (C), magenta (M), and yellow (Y) in the seventh configuration.

Further, the component region may be defined as a space large enough to subsume a range of possible errors that may occur due to the photographic environment of the image. For example, a color at specific coordinates may be defined as a color in a typical photographic environment, and a region including the range of possible errors that may occur due to the photographic environment may be defined from this color as the component region. As a configuration for achieving this, the configuration described above may be modified by a ninth configuration described below.

In accordance with a ninth configuration of the present invention, the component region is, in the seventh or eighth configuration, preferably defined as a region that includes an allowable error range upon image acquisition of the component of the information color or the color component included in the combined color corresponding to the component represented by the specific coordinates of this component region.

According to this configuration, the original color of a cell marked in a different color from the original color due to the photographic environment of the image representing the two-dimensional code corresponds to the center coordinates of the component region, and therefore the color of the mark is unlikely to deviate from the component region. As a result, the color of the cell is more likely to be identified as the color of the specific coordinates, or in other words the original color.

In each of the above configurations, the cells arranged in m×n may be separated by a separator to which a predetermined color is attached, and the components respectively represented by specific coordinates in the component regions located in the component model may be used as the components of the information colors or the respective color components included in the combined colors, and also as a component of the color attached to the separator.

According to this configuration, the separator is formed in a color of a different component region from the colors of the marks attached to the cells. Therefore, even when the separator is formed in a different color from the original color thereof due to the photographic environment of the image representing the two-dimensional code, the color of the separator can be identified as the original color, or in other words identified reliably as the separator, as long as the color remains within the component region.

To achieve the foregoing objective and in accordance with a tenth configuration of the present invention, a two-dimensional code formed by arranging cells in m×n (1≤m, 1≤n) is provided. Cell groups are formed by dividing the cells arranged in m×n into cell groups respectively constituted by one or more cells. A plurality of colors (to be referred to hereafter as "information colors") or color combinations (to be referred to hereafter as "combined colors") are respectively associated with different information. A mark is attached to each cell group using an information color or a combined color associated with information to be expressed by the cell group, from among the information colors and combined colors. Within a multi-dimensional space representing a distribution of color components, components represented by specific coordinates in a plurality of component regions extending respectively as multi-dimensional regions correspond respectively to components of the information colors or respective color components included in the combined colors. The components represented by the specific coordinates in the component regions include at least color components of cyan (C), magenta (M), and yellow (Y).

To achieve the foregoing objective and in accordance with an eleventh configuration of the present invention, a two-dimensional code reader for recognizing information by reading a two-dimensional code formed by arranging cells in m×n (1≤m, 1≤n) is provided. The two-dimensional code reader includes an image acquisition section for obtaining an image representing the two-dimensional code, a cell identifying section for identifying, from the image obtained by the image acquisition section, colors of marks attached respectively to the cells of the two-dimensional code represented by the image, and an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section. Within a multi-dimensional space representing a distribution of color components, components represented by specific coordinates in a plurality of component regions extending respectively as multi-dimensional regions correspond respectively to components of the information colors or respective color components included in the combined colors. Each of the component regions is located in a coordinate position within the multi-dimensional space for maximizing the component of the information color or one of the respective color components included in the combined color. The cell identifying section determines, in relation to each of the cells in the two-dimensional code, the component region in which the component of the color attached to the cell is distributed, and identifies, as the color attached to the cell, the color of the component represented by the specific coordinates of the determined component region.

The two-dimensional code reader thusly configured is suitable for recognizing information from the two-dimensional code according to any of the seventh to tenth configurations described above.

In accordance with a twelfth configuration of the present invention, the components represented by the specific coordinates in the component regions preferably include at least color components of cyan (C), magenta (M), and yellow (Y) in the eleventh configuration.

In accordance with a thirteenth configuration of the present invention, the component region is, in the eleventh or twelfth configuration, preferably defined as a region that includes an allowable error range upon image acquisition of the component of the information color or the color component included in the combined color corresponding to the component represented by the specific coordinates of this component region.

According to this configuration, the original color of a cell marked in a different color from the original color due to the photographic environment of the image representing the two-dimensional code corresponds to the center coordinates of the component region. Therefore, the color of the mark is unlikely to deviate from the component region. As a result, the color of the cell is more likely to be identified as the color of the specific coordinates, or in other words the original color.

Further, in any of the eleventh to thirteenth configurations, the cell identifying section may determine, in relation to a cell in each position of the two-dimensional code, the component region located in the component model in which the component of the color attached to the cell is distributed, and identify, as the color attached to the cell, the color of the component represented by the center coordinates of the determined component region.

This configuration is suitable for recognizing information from a two-dimensional code.

In the thirteenth configuration, from an image region of the image obtained by the image acquisition section, the cell identifying section may identify, from among the component regions located in the component model, a region having a color represented by a component in a component region allocated to a separator that separates the respective cells of the two-dimensional code, and the cell identifying section may assume that the identified region is the separator of the two-dimensional code, and identifies respective regions separated by the separator as the positions of the cells in the two-dimensional code.

To achieve the foregoing objective and in accordance with a fourteenth configuration of the present invention, a two-dimensional code reader for recognizing information by reading a two-dimensional code formed by arranging cells in m×n (1≤m, 1≤n) is provided. The two-dimensional code reader includes an image acquisition section for obtaining an image representing the two-dimensional code, a cell identifying section for identifying, from the image obtained by the image acquisition section, colors of marks attached respectively to the cells of the two-dimensional code represented by the image, and an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section. Within a multi-dimensional space representing a distribution of color components, components represented by specific coordinates in a plurality of component regions extending respectively as multi-dimensional regions correspond respectively to components of the information colors or respective color components included in the combined colors. The components represented by the specific coordinates in the component regions include at least color components of cyan (C), magenta (M), and yellow (Y). The cell identifying section determines, in relation to each of the cells in the two-dimensional code, the component region in which the component of the color attached to the cell is distributed, and identifies, as the color attached to the cell, the color of the component represented by the specific coordinates of the determined component region.

To achieve the foregoing objective, a program may be provided that causes a computer to function as all constitutional sections provided in the two-dimensional code reader according to any one of the eleventh to fourteenth configurations.

The computer controlled by the second program may constitute a part of the two-dimensional code reader according to any of the eleventh to fourteenth configurations.

The second program described above is constituted by a sequenced string of commands suitable for processing executed by a computer system, and is provided to the two-dimensional code reader, a user using the two-dimensional code reader, or the like via various types of recording media or a communication line.

DETAILED DESCRIPTION OF THE PREFERRED EMBODIMENTS

An embodiment of the present invention will be described below with reference to the drawings.

(1) Overall Configuration

Figure 1:
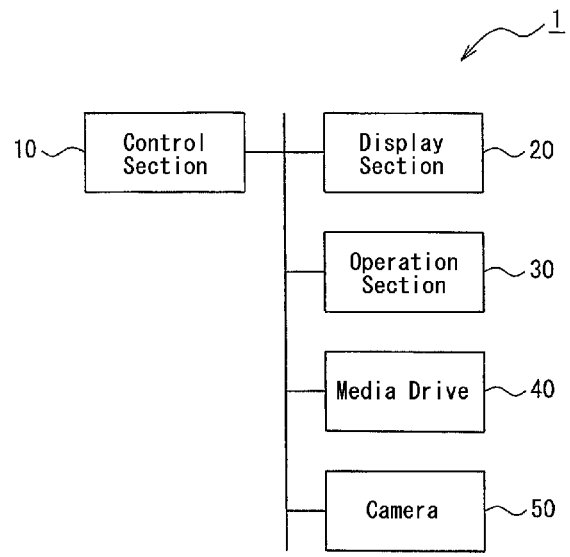
FIG. 1 is a block diagram showing a configuration of a two-dimensional code reader.

As shown in FIG. 1, a two-dimensional code reader 1 includes a control section 10 that controls the entire two-dimensional code reader 1, a display section 20 that displays various information, an operation section 30 that is operated by a user, a media drive 40 into which data can be input from the outside of the two-dimensional code reader 1 via a medium, a camera 50 capable of obtaining image data representing an image, and the like.

The two-dimensional code reader 1 is packaged for use in a portable telephone terminal, a portable information terminal, a known personal computer, or the like, for example.

(2) Regarding Two-Dimensional Code

A two-dimensional code 100 read by the two-dimensional code reader 1 will now be described.

Figure 2:
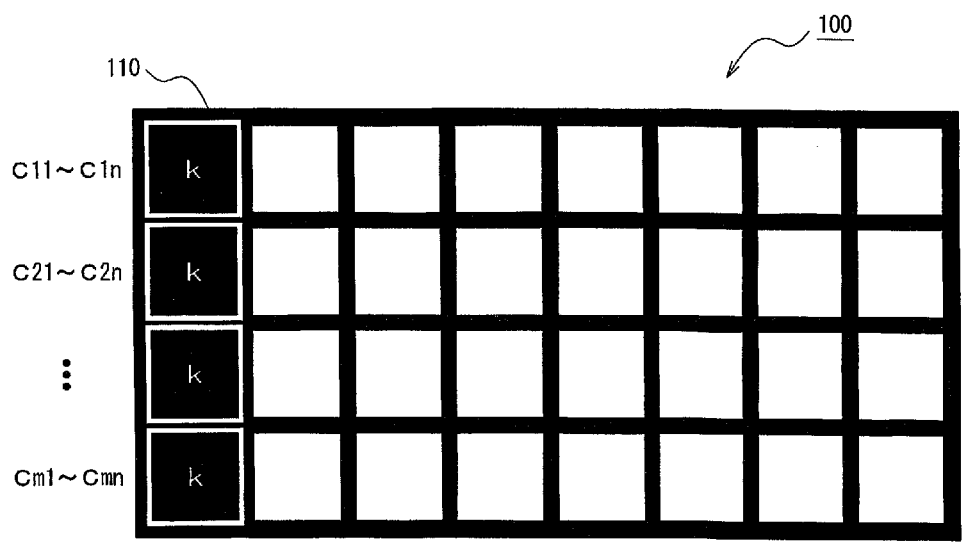
FIG. 2 is a view showing a two-dimensional code.

As shown in FIG. 2, the two-dimensional code 100 is constructed by arranging cells C11 to Cmn in m×n (1≤m, 1≤n) on a black separator 110. The respective cells C are arranged with fixed gaps therebetween.

In the two-dimensional code 100, cell groups are formed by dividing the cells arranged in m×n into cell groups respectively constituted by one or more cells, and a mark is attached to each cell group using an information color or a combined color associated with information to be expressed by the cell group, from among a plurality of colors (to be referred to hereafter as "information colors") or color combinations (to be referred to hereafter as "combined colors") respectively associated with different information. In this embodiment, the mark is attached to the cell C by coloring the cell C in the corresponding color so that the cell C forms a region of the color.

Further, of the cells C on each row, cells C11 to Cm1 positioned in a starting location (the left end of the drawing; likewise hereafter) are assigned as identification cells for identifying a position of the two-dimensional code 100. Thus, the colors attached to the identification cells and the separator 110 form a pattern from which the position and an orientation of the two-dimensional code 100 can be identified.

Figure 3A:
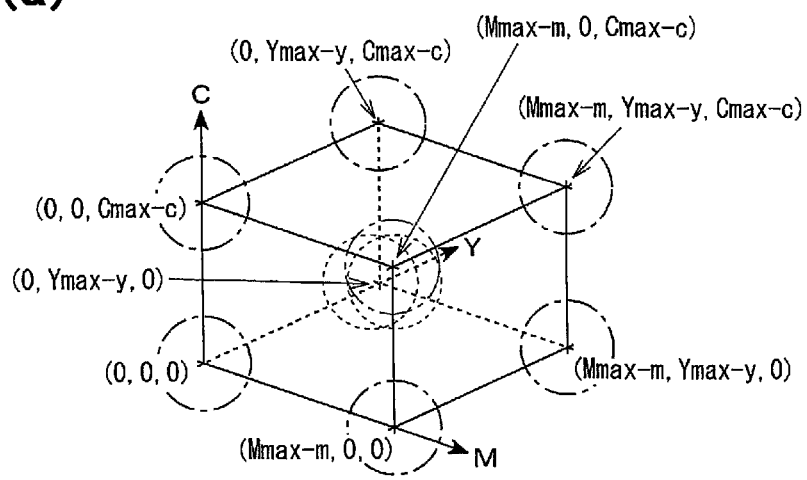
FIG. 3 is a view showing a component model.
Figure 3B:
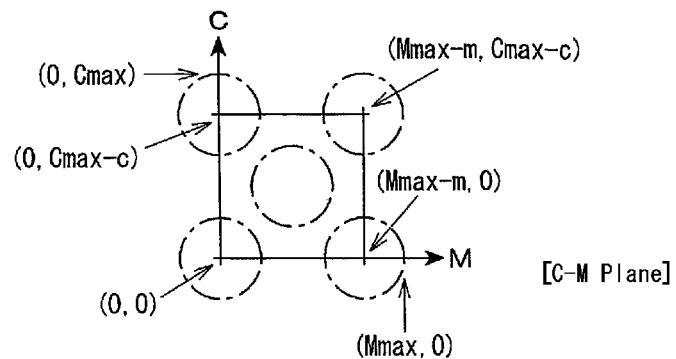
Figure 3C:
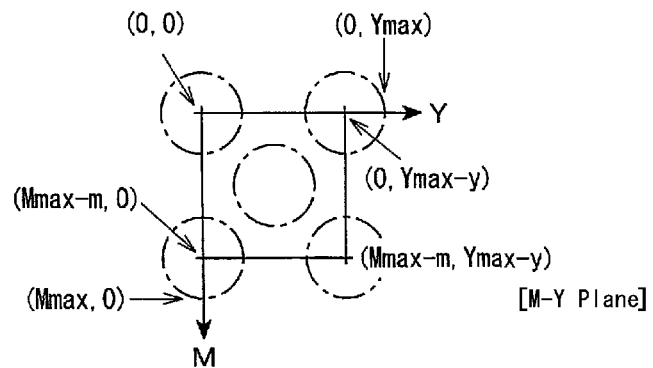

As shown in FIG. 3, the colors of the marks attached to the respective cells C are determined using a component model on which a plurality of component regions (9 regions in this embodiment) extending in a spherical shape as three-dimensional regions are located within a three-dimensional space representing a distribution of cyan (C), magenta (M), and yellow (Y) in sizes and positional relationships that prevent interference between the component regions. More specifically, the marks are attached to the cell groups using components represented by center coordinates of the respective component regions located in the component model as components of the information colors or respective color components included in the combined colors.

"Preventing interference between the component regions" means ensuring that the respective component regions do not overlap by disposing the respective component regions via intervals or disposing boundaries of the respective component regions adjacent to each other.

Further, the size of the component region is defined as a space large enough to subsume a range of possible errors that may occur due to a photographic environment of an image. In this embodiment, a color at specific coordinates is defined as a color in a typical photographic environment, and a region including the range of possible errors that may occur due to the photographic environment is defined from this color as the component region.

Further, a color (in this embodiment, a color of a component close to black) at the center coordinates of a component region not used as the colors of the marks attached to the cells C is used as the color of the marks attached to the identification cells of the two-dimensional code 100 and the color of the separator 110.

(3) Information Recognition Processing

Figure 4:
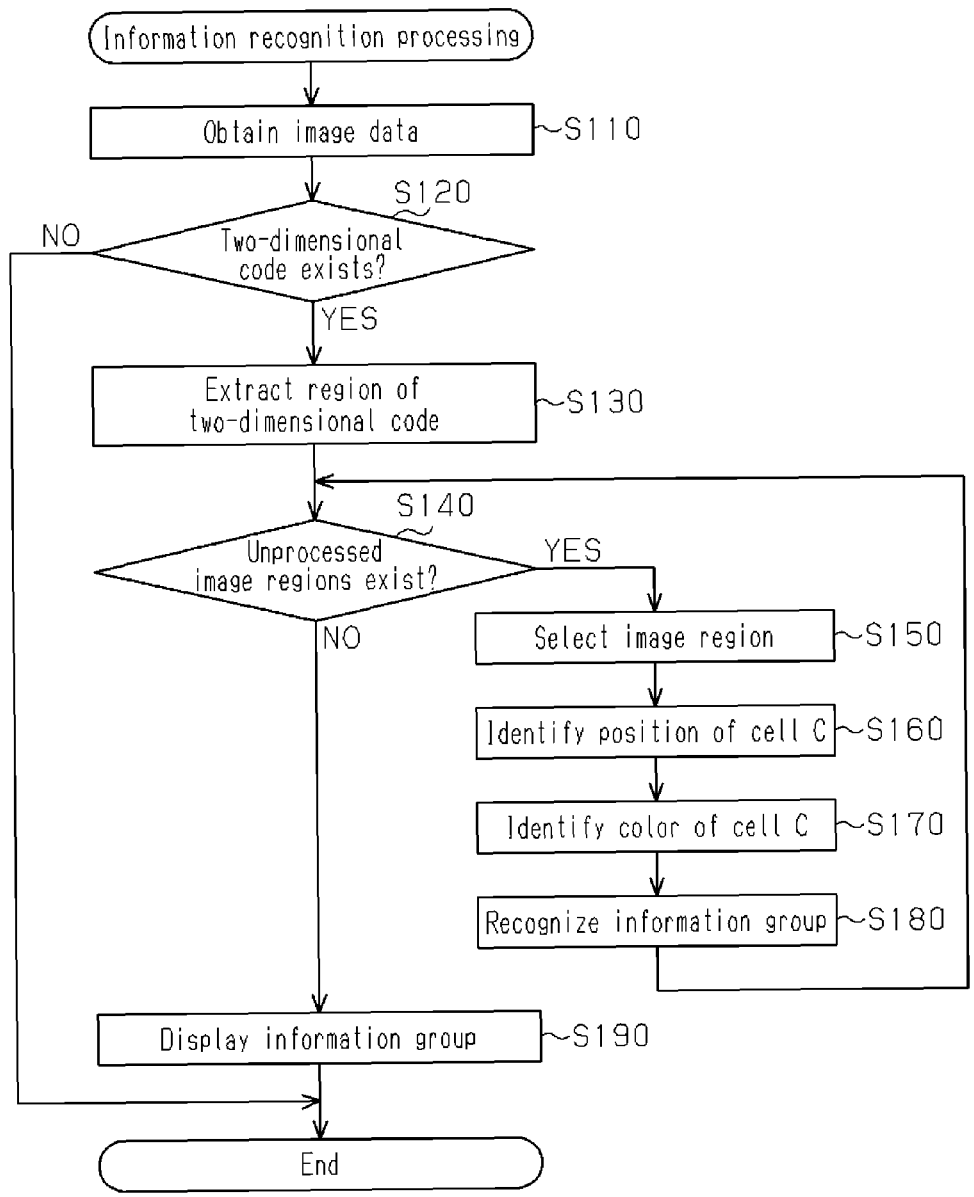
FIG. 4 is a flowchart showing information recognition processing.

A processing procedure for information recognition processing executed by (the control section 10 of) the two-dimensional code reader 1 will be described below on the basis of FIG. 4. The information recognition processing is started when an operation for starting the information recognition processing is performed on the operation section 30.

First, image data are obtained (s110). Image data representing an image photographed by the camera 50, image data input from a medium via the media drive 40, image data generated by the control section 10 itself, and the like are read to an inbuilt memory of the control section 10.

Next, a check is performed on the image data obtained in s110 to determine whether or not the two-dimensional code 100 exists in the image represented by the image data (s120). First, the image represented by the image data obtained in s110 is searched for the pattern identifying the position of the two-dimensional code 100. When the pattern, or in other words the region constituted by the identification cells and the separator 110, is detected, it is determined that the two-dimensional code 100 exists.

When it is determined in the search of s120 that the two-dimensional code 100 does not exist (s120: NO), the information recognition processing is terminated.

On the other hand, when it is determined in the search of s120 that the two-dimensional code 100 exists (s120: YES), respective image regions of the two-dimensional code 100 are extracted from the image represented by the image data (s130). Image regions including the pattern identifying the position of the two-dimensional code 100 are extracted from the image represented by the image data obtained in s110 as the respective image regions of the two-dimensional code 100. Thus, image data constituted by the image regions extracted in this manner are generated.

Next, a check is performed to determine whether or not unprocessed image regions exist among the regions of the two-dimensional code 100 extracted in s130 (s140). A check is performed to determine whether or not unprocessed image regions to be subjected to information group recognition in subsequent processing exist among the image regions of the two-dimensional code 100 extracted in s130.

When it is determined in s140 that unprocessed image regions exist (s140: YES), one of the unprocessed image regions is selected as a subject for the subsequent processing (s150).

Next, the respective positions of the cells C in the two-dimensional code 100 included in the image are identified from the image region selected in s150 (s160). First, a region having a color represented by a component in the component region allocated to the separator 110 that separates the respective cells C of the two-dimensional code 100, from among the component regions located in the component model, is identified from the image region selected in s150. Next, assuming that this region is the separator 110 of the two-dimensional code 100, the respective regions separated by the separator 110 are identified as the positions of the cells C in the two-dimensional code 100. At this time, the region is determined to be the region of the separator 110 when the color-detected region of the image region is a component distributed in (positioned within) the component region corresponding to the separator 110.

Next, the colors of the marks attached respectively to the cells C whose positions were identified in s160 are identified (s170). The component region located in the component model in which the component of the color attached to a cell C is distributed is determined in relation to each of the cells C whose position was identified in s160, and a color of a component represented by the specific coordinates in the determined component region is determined to be the color of the mark attached to the corresponding cell C. At this time, the region is determined to be a region of a cell C when the color-detected region of the image region is a component distributed in one of the component regions corresponding to the cells C.

Next, an information group corresponding to a cell group constituted by one or more cells C of the two-dimensional code 100 is recognized on the basis of the positions of the cells C identified in s160, and the colors of the cells C identified in s170 (s180). Colors or color combinations attached to the respective cell groups constituted by one or more cells C of the two-dimensional code 100 are identified on the basis of the positions of the cells C and the colors of the marks attached thereto, and information corresponding to the identified colors or color combinations is identified on the basis of a database in which correspondence relationships between the colors or color combinations of the respective cell groups and the information are registered. The information (information group) identified in this manner serves as an information group recognized from the two-dimensional code 100 represented by the image region extracted in s150.

When recognition has been implemented in s180, the processing returns to s140, and thereafter, s140 to s180 are performed repeatedly until all of the two-dimensional codes 100 extracted in s130 have been processed.

When it is determined in s140 that no unprocessed image regions exist, or in other words that s140 to s160 have been performed on all of the two-dimensional codes 100 (s140: NO), the respective information groups recognized in s180 (or if no information is recognized in s160, a message to the same effect) are displayed on the display section 20 (s190), whereupon the information recognition processing is terminated. When a predetermined operation is performed on the operation section 30 after displaying the information groups on the display section 20 in s170, the information groups are recorded in a RAM 16 or a medium set in the media drive 40.

(4) Operation, Advantage

In the two-dimensional code 100 according to this embodiment, the marks are attached to the respective cell groups using the information colors or combined colors associated with the information to be expressed by the cell groups, and the marks of the respective cells C in the cell groups are attached using the colors at the specific coordinates of the component regions that are located in the component model representing the color component distribution in a positional relationship for preventing interference between the component regions.

In other words, the marks are attached to the respective cells C such that the color components do not interfere with other cells C, excluding cells C marked in the color of an identical component region, and therefore, as long as at least the component region of the color attached to the cell C can be identified, it is possible to determine that the cell C is marked with the color of the specific coordinates in the component region without identifying that the color of the mark corresponds to the color of the specific coordinates in the component region.

This means that even in a cell C that is marked in a different color from its original color due to the photographic environment of the image representing the two-dimensional code 100, the color thereof can be identified as the color of the specific coordinates, or in other words the original color, as long as the color of the mark remains within the component region.

Hence, the influence of a difference in color from the original color due to the photographic environment can be suppressed by the component region, and therefore the color of the mark attached to each cell C can be determined appropriately on the control section 10. As a result, erroneous recognition of the information expressed by the cell group can be prevented.

Further, according to this embodiment, the original color of a cell C marked in a different color from the original color due to the photographic environment of the image representing the two-dimensional code 100 corresponds to the center coordinates of the component region, and therefore the color attached as the mark is unlikely to deviate from the component region. As a result, the color of the cell C is more likely to be identified as the color of the specific coordinates, or in other words the original color, on the control section 10.

Furthermore, according to this embodiment, the separator is formed in the two-dimensional code 100 in a color of a different component region from the colors of the marks attached to the cells C, and therefore, even when the separator is formed in a different color from the original color thereof due to the photographic environment of the image representing the two-dimensional code 100, the color of the separator can be identified as the original color, or in other words identified reliably as the separator, on the control section 10 as long as the color remains within the component region.

(5) Modifications

An embodiment of the present invention was described above, but the present invention is not limited to the above embodiment, and may be implemented in various embodiments within the technical scope thereof.

For example, in the above embodiment, a condition in which marks are attached to the cells C is realized by configuring the cells C of the two-dimensional code 100 as regions of corresponding colors. However, marks may be attached to the cells C by recording a specific symbol or a specific graphic (various graphics such as a circle, a polygon, or the like, for example) in each cell, and the like, for example.

Further, in the above embodiment, a case in which the component model is a three-dimensional space was described. However, as long as the component model represents a distribution of color components in a multi-dimensional space, the space need not be three-dimensional.

Furthermore, in the above embodiment, the component regions located in the component model define the number of colors used in the two-dimensional code 100, and as long as the component regions can be located in non-interfering regions, there are no particular limitations on the specific number thereof.

Moreover, in the above embodiment, the component model is constituted by a CMY color space, but as long as the color space of the component model represents color components in a three-dimensional space, a color space other than CMY may be employed.

Further, a single color is used for the entire separator 110 of the two-dimensional code 100 according to the above embodiment, but the separator 110 may be formed in colors determined in advance in accordance with the colors of the marks attached to cells C that are adjacent in a single direction. In this case, when the positions of the cells C are identified in s160 of FIG. 4, the colors of the cells C may be identified in a process for scanning the image region in a fixed direction. Then, when the color of the separator 110 corresponding to these colors is detected, it may be determined that the region of the cells C of which colors have been previously identified is at an end and the region of the separator 110 has been reached. In this case, the separator 110 need not be formed in a single color, and therefore a degree of color freedom can be increased, leading to an increase in the design freedom of the two-dimensional code 100.

(6) Correspondence Relationships with the Present Invention

In the embodiment described above, s110 of FIG. 4 corresponds to an image acquisition section according to the present invention, s160 and s170 of FIG. 4 correspond to a cell identifying section according to the present invention, and s180 of FIG. 4 corresponds to an information acquisition section according to the present invention.
1 two-dimensional code reader
10 control section
20 display section
30 operation section
40 media drive
50 camera
100 two-dimensional code
110 separator
C cell

The invention claimed is:

1. A two-dimensional code formed by arranging cells in m×n (1≤m, 1≤n), wherein
cell groups are formed by dividing the cells arranged in m×n into cell groups respectively constituted by one or more cells, a plurality of colors (to be referred to hereafter as "information colors") or color combinations (to be referred to hereafter as "combined colors") are respectively associated with different information, and a mark is attached to each cell group using an information color or a combined color associated with information to be expressed by the cell group, from among the information colors and combined colors,
when a component model is defined, in which a plurality of component regions respectively extending as multi-dimensional regions are located within a multi-dimensional space representing a distribution of color components in a positional relationship that prevents interference between the component regions, the marks are attached to the cell groups using components represented by specific coordinates in the component regions located in the component model as components of the information colors or respective color components included in the combined colors,
the component regions are located in the component model so as to extend respectively from the specific coordinates, and
components represented by center coordinates of the respective component regions are used as the components of the information colors or the respective color components included in the combined colors.

2. The two-dimensional code according to claim 1, wherein
the cells arranged in m×n are separated by a separator to which a predetermined color is attached, and
the components respectively represented by specific coordinates in the component regions located in the component model are used as the components of the information colors or the respective color components included in the combined colors, and also as a component of the color attached to the separator.

3. A two-dimensional code reader for recognizing information by reading a two-dimensional code formed by arranging cells in m×n (1≤m, 1≤n), the two-dimensional code reader, wherein
an image acquisition section for obtaining an image representing the two-dimensional code;
a cell identifying section for identifying, from the image obtained by the image acquisition section, colors of marks attached respectively to the cells of the two-dimensional code represented by the image; and
an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section,
wherein, when a component model is defined, in which a plurality of component regions respectively extending as multi-dimensional regions from specific center coordinates are located within a multi-dimensional space representing a distribution of color components in a positional relationship that prevents interference between the component regions, the cell identifying section determines, in relation to each of the cells in the two-dimensional code, the component region located in the component model in which the component of the color attached to the cell is distributed, and identifies, as the color attached to the cell, the color of a component represented by center coordinates of the determined component region.

4. The two-dimensional code reader according to claim wherein, from an image region of the image obtained by the image acquisition section, the cell identifying section identifies, from among the component regions located in the component model, a region having a color represented by a component in a component region allocated to a separator that separates the respective cells of the two-dimensional code, and the cell identifying section assumes that the identified region is the separator of the two-dimensional code, and identifies respective regions separated by the separator as the positions of the cells in the two-dimensional code.

5. A computer readable medium encoded with program instruction steps, which, when executed by a computer, performs:
obtaining an image representing the two-dimensional code;
identifying, from the image obtained, colors of marks attached respectively to the cells of the two-dimensional code represented by the image;
identifying, on the basis of the colors of the cells identified, information corresponding to a color or a color combination attached to a cell group constituted by one or more cells of the two-dimensional code using a database in which a correspondence relationship between the information and the color or the color combination attached to the cell group constituted by one or more cells is registered; and obtaining the identified information as an information group that is recognized from the two-dimensional code represented by the image obtained, wherein, when a component model is defined, in which a plurality of component regions respectively extending as multi-dimensional regions from specific center coordinates are located within a multi-dimensional space representing a distribution of color components in a positional relationship that prevents interference between the component regions, the cell identifying section determines, in relation to each of the cells in the two-dimensional code, the component region located in the component model in which the component of the color attached to the cell is distributed, and identifies, as the color attached to the cell, the color of a component represented by center coordinates of the determined component region.

6. A two-dimensional code formed by arranging cells in m×n (1≤m, 1≤n), wherein cell groups are formed by dividing the cells arranged in m×n into cell groups respectively constituted by one or more cells, a plurality of colors (to be referred to hereafter as "information colors") or color combinations (to be referred to hereafter as "combined colors") are respectively associated with different information, and a mark is attached to each cell group using an information color or a combined color associated with information to be expressed by the cell group, from among the information colors and combined colors, within a multi-dimensional space representing a distribution of color components, components represented by specific coordinates in a plurality of component regions extending respectively as multi-dimensional regions correspond respectively to components of the information colors or respective color components included in the combined colors, the component regions are located in the component model so as to extend respectively from the specific coordinates, components represented by center coordinates of the respective component regions are used as the components of the information colors or the respective color components included in the combined colors; and each of the component regions is located in a coordinate position within the multi-dimensional space for maximizing the component of the information color or one of the respective color components included in the combined color.

7. The two-dimensional code according to claim 6, wherein the components represented by the specific coordinates in the component regions include at least color components of cyan (C), magenta (M), and yellow (Y).

8. The two-dimensional code according to claim 6, wherein the component region is defined as a region that includes an allowable error range upon image acquisition of the component of the information color or the color component included in the combined color corresponding to the component represented by the specific coordinates of this component region.

9. A two-dimensional code formed by arranging cells in m×n (1≤m, 1≤n), wherein cell groups are formed by dividing the cells arranged in m×n into cell groups respectively constituted by one or more cells, a plurality of colors (to be referred to hereafter as "information colors") or color combinations (to be referred to hereafter as "combined colors") are respectively associated with different information, and a mark is attached to each cell group using an information color or a combined color associated with information to be expressed by the cell group, from among the information colors and combined colors, within a multi-dimensional space representing a distribution of color components, components represented by center coordinates in a plurality of component regions extending respectively from specific center coordinates as multi-dimensional regions correspond respectively to components of the information colors or respective color components included in the combined colors, and the components represented by the center coordinates in the component regions include at least color components of cyan (C), magenta (M), and yellow (Y).

10. A two-dimensional code reader for recognizing information by reading a two-dimensional code formed by arranging cells in m×n (1≤m, 1≤n), the two-dimensional code reader, wherein an image acquisition section for obtaining an image representing the two-dimensional code;

a cell identifying section for identifying, from the image obtained by the image acquisition section, colors of marks attached respectively to the cells of the two-dimensional code represented by the image; and an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section, within a multi-dimensional space representing a distribution of color components, components represented by center coordinates in a plurality of component regions extending respectively from specific center coordinates as multi-dimensional regions correspond respectively to components of the information colors or respective color components included in the combined colors, each of the component regions is located in a coordinate position within the multi-dimensional space for maximizing the component of the information color or one of the respective color components included in the combined color, and the cell identifying section determines, in relation to each of the cells in the two-dimensional code, the component region in which the component of the color attached to the cell is distributed, and identifies, as the color attached to the cell, the color of the component represented by the center coordinates of the determined component region.

11. The two-dimensional code reader according to claim 10, wherein the components represented by the specific coordinates in the component regions include at least color components of cyan (C), magenta (M), and yellow (Y).

12. The two-dimensional code reader according to claim 10—wherein the component region is defined as a region that includes an allowable error range upon image acquisition of the component of the information color or the color component included in the combined color corresponding to the component represented by the specific coordinates of this component region.

13. A two-dimensional code reader for recognizing information by reading a two-dimensional code formed by arranging cells in m×n (1≤m, 1≤n), the two-dimensional code reader, wherein an image acquisition section for obtaining an image representing the two-dimensional code;

a cell identifying section for identifying, from the image obtained by the image acquisition section, colors of marks attached respectively to the cells of the two-dimensional code represented by the image; and an information acquisition section for identifying, on the basis of the colors of the cells identified by the cell identifying section, information corresponding to a color or a color combination attached to a cell group constituted by one or more cells of the two-dimensional code using a database in which a correspondence relationship between the information and the color or the color combination attached to the cell group constituted by one or more cells is registered, and obtaining the identified information as an information group that is recognized from the two-dimensional code represented by the image obtained by the image acquisition section, wherein within a multi-dimensional space representing a distribution of color components, components represented by center coordinates in a plurality of component regions extending respectively from specific center coordinates as multi-dimensional regions correspond respectively to components of the information colors or respective color components included in the combined colors, the components represented by the center coordinates in the component regions include at least color components of cyan (C), magenta (M), and yellow (Y), and the cell identifying section determines, in relation to each of the cells in the two-dimensional code, the component region in which the component of the color attached to the cell is distributed, and identifies, as the color attached to the cell, the color of the component represented by the center coordinates of the determined component region.

14. A non-transitory computer readable medium encoded with program instruction steps, which, when executed by a computer, performs:

obtaining an image representing the two-dimensional code;

identifying, from the image obtained, colors of marks attached respectively to the cells of the two-dimensional code represented by the image;

identifying, on the basis of the colors of the cells identified, information corresponding to a color or a color combination attached to a cell group constituted by one or more cells of the two-dimensional code using a database in which a correspondence relationship between the information and the color or the color combination attached to the cell group constituted by one or more cells is registered;

obtaining the identified information as an information group that is recognized from the two-dimensional code represented by the image obtained; and determining, in relation to each of the cells in the two-dimensional code, the component region in which the component of the color attached to the cell is distributed, and identifies, as the color attached to the cell, the color of the component represented by the center coordinates of the determined component region, wherein within a multi-dimensional space representing a distribution of color components, components represented by specific center coordinates in a plurality of component regions extending respectively from specific center coordinates as multi-dimensional regions correspond respectively to components of the information colors or respective color components included in the combined colors, each of the component regions is located in a coordinate position within the multi-dimensional space for maximizing the component of the information color or one of the respective color components included in the combined color.

* * * * *